(12) United States Patent
Wang et al.

(10) Patent No.: US 8,072,705 B1
(45) Date of Patent: Dec. 6, 2011

(54) METHOD AND SYSTEM FOR PROVIDING A MAGNETIC WRITER USING A BARC

(75) Inventors: Yizhong Wang, San Jose, CA (US); Hong Zhang, Fremont, CA (US); Hai Sun, Milpitas, CA (US); Hongping Yuan, Fremont, CA (US); Winnie Yu, San Jose, CA (US)

(73) Assignee: Western Digital (Fremont), LLC, Fremont, CA (US)

( * ) Notice: Subject to any disclaimer, the term of this patent is extended or adjusted under 35 U.S.C. 154(b) by 1136 days.

(21) Appl. No.: 11/803,071

(22) Filed: May 11, 2007

(51) Int. Cl.
*G11B 5/147* (2006.01)
(52) U.S. Cl. ............ 360/125.03; 360/125.02; 360/125.3
(58) Field of Classification Search ............. 360/125.02, 360/125.03, 125.3
See application file for complete search history.

(56) References Cited

U.S. PATENT DOCUMENTS

| | | | |
|---|---|---|---|
| 6,369,983 B1 | 4/2002 | Hong | |
| 6,501,618 B1 | 12/2002 | Kamijima et al. | |
| 2001/0022704 A1* | 9/2001 | Hong | 360/126 |
| 2006/0044681 A1 | 3/2006 | Le et al. | |
| 2006/0044682 A1* | 3/2006 | Le et al. | 360/126 |
| 2006/0168794 A1 | 8/2006 | Contreras et al. | |
| 2006/0174474 A1* | 8/2006 | Le | 29/603.12 |
| 2006/0256482 A1* | 11/2006 | Araki et al. | 360/319 |
| 2008/0100959 A1* | 5/2008 | Feldbaum et al. | 360/110 |
| 2009/0169732 A1* | 7/2009 | Hong et al. | 427/130 |

OTHER PUBLICATIONS

Usujima, et al., "Effects of Substrate Treatment in Positive Chemically-Amplified Resist", SPIE vol. 2438, pp. 529-539, 1995.
Chun, et al., "Study on Reduction of Substrates Dependency of Chemically Amplified Resist", SPIE vol. 2724, pp. 92-99, 1996.

* cited by examiner

*Primary Examiner* — Jefferson Evans (57) ABSTRACT

A method and system for providing a magnetic writer are described. The method and system include providing a bottom antireflective coating (BARC) on a portion of the magnetic writer. The BARC has a low reflectivity. The method and system also include providing a barrier layer on at least a portion of the BAR and providing a mask on at least a portion of the barrier layer. The barrier layer isolates the BARC from the mask.

21 Claims, 9 Drawing Sheets

METHOD AND SYSTEM FOR PROVIDING A MAGNETIC WRITER USING A BARC

BACKGROUND

Figure 1:
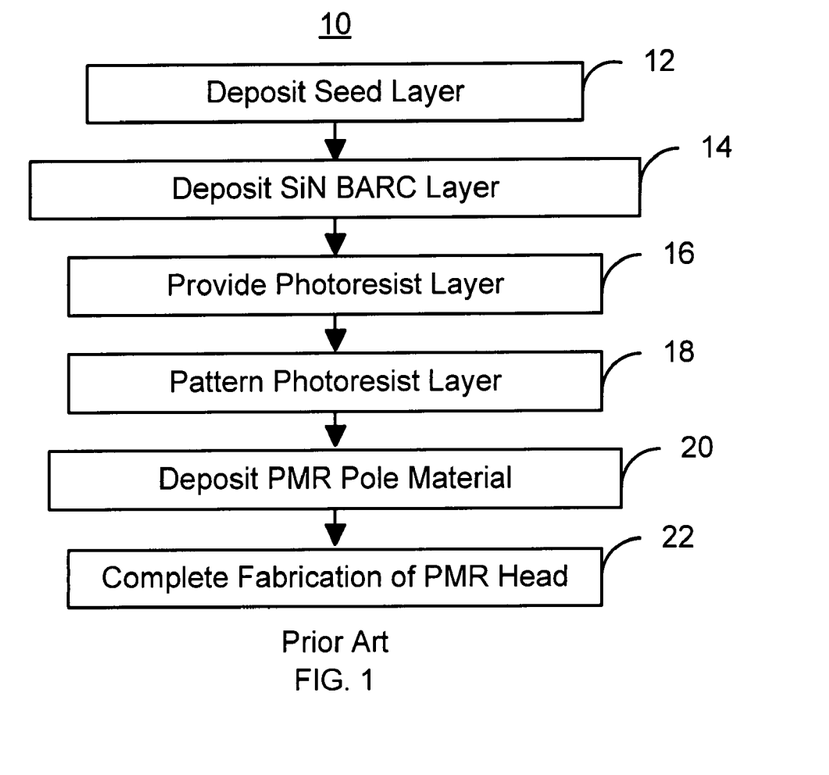
FIG. 1 is a flow chart depicting a conventional method for providing a conventional PMR head.
Figure 2:
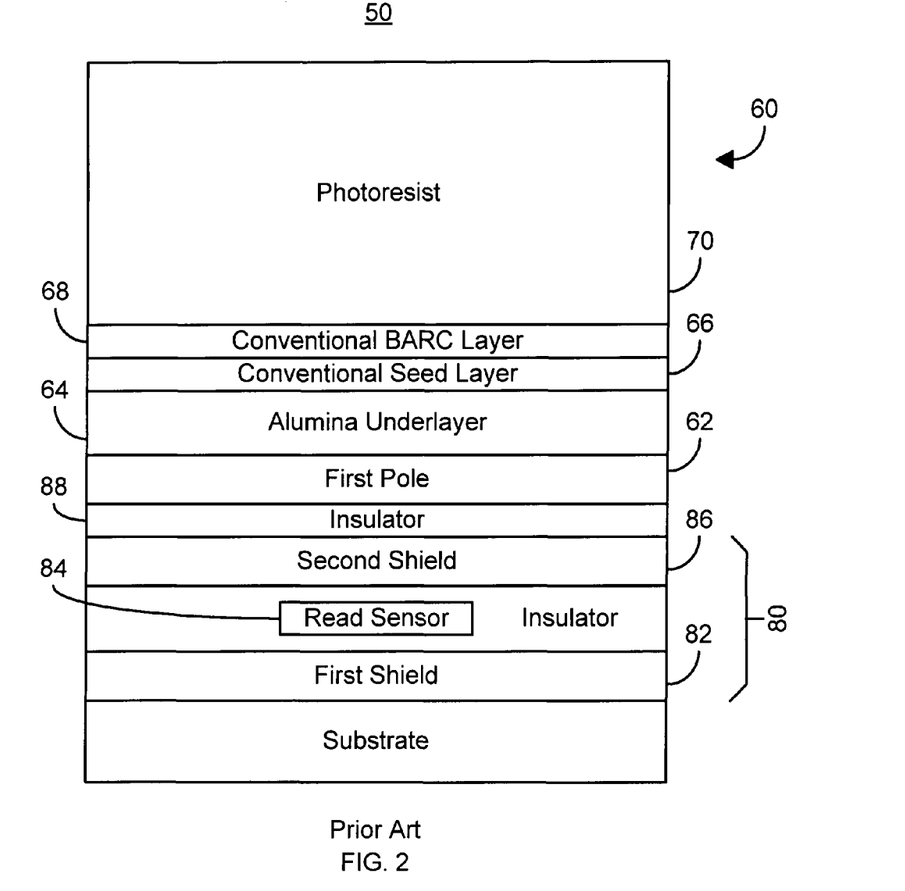
FIGS. 2-4 depict a conventional perpendicular magnetic recording head during fabrication.
Figure 3:
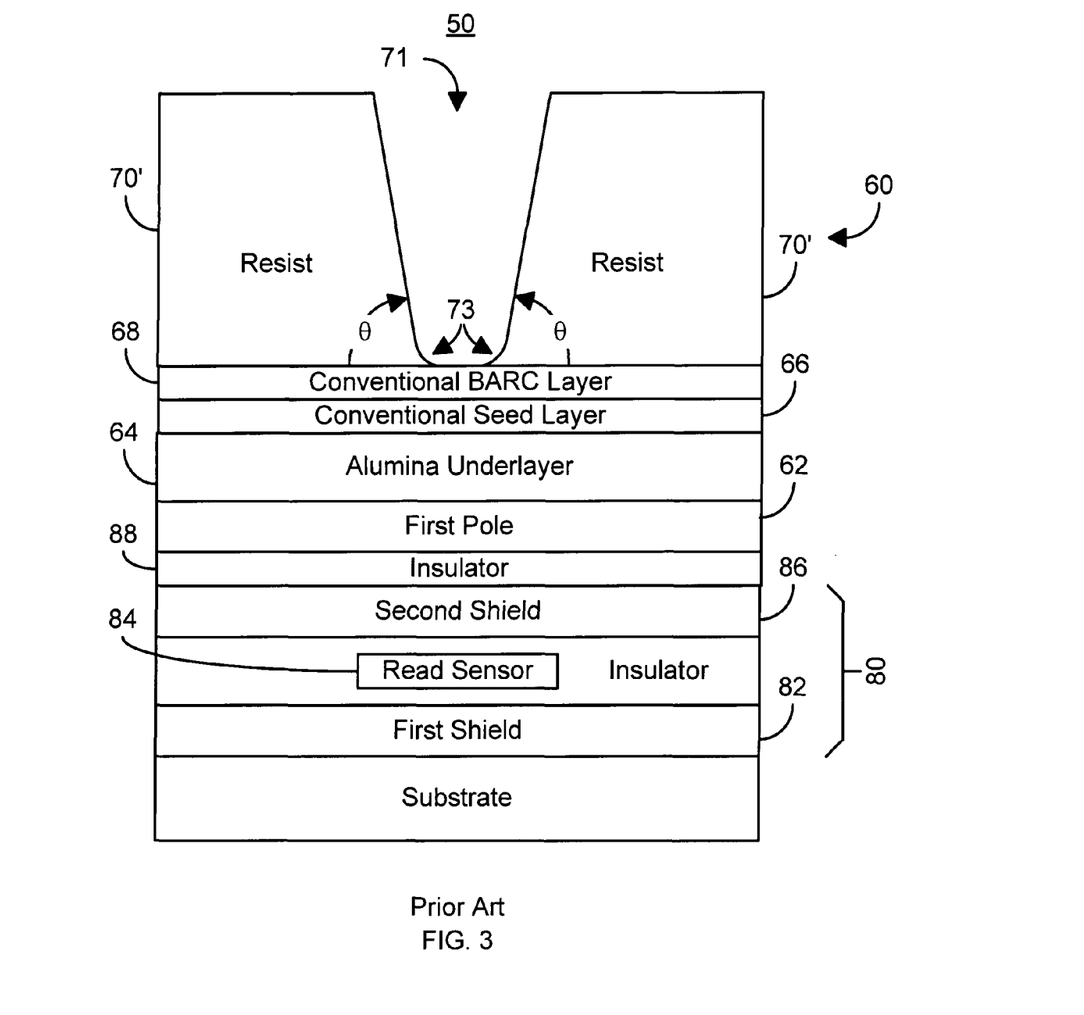
Figure 4:
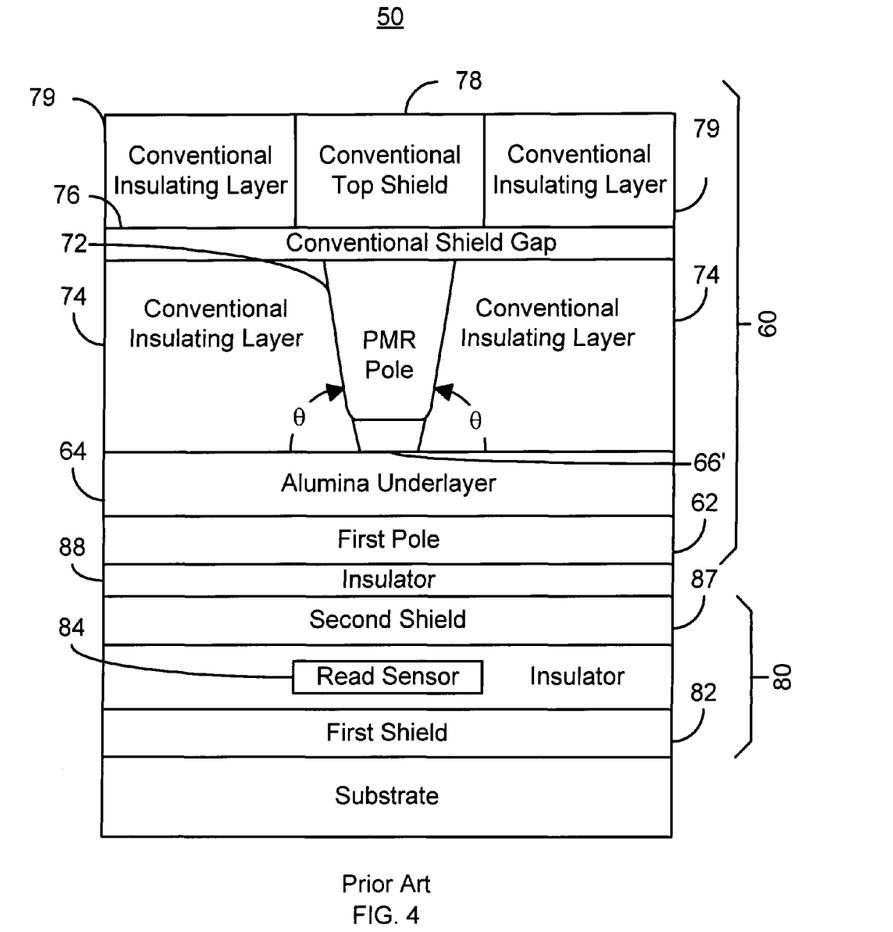

FIG. 1 depicts a conventional method 10 for fabricating a conventional perpendicular magnetic recording (PMR) pole of a conventional PMR transducer. FIGS. 2-4 depict the conventional PMR head 50 during fabrication using the conventional method 10 as viewed from the air-bearing surface (ABS). For clarity, the conventional PMR head 50 is not to scale. Referring to FIGS. 1-4, the method 10 commences after formation of an alumina underlayer. A conventional seed layer, such as Ru, is deposited, via step 12. A conventional bottom antireflective coating (BARC) layer of SiN is typically, deposited, via step 14. The conventional BARC layer may be used to reduce or eliminate reflections from the underlying substrate A photoresist layer is provided on the conventional BARC is provided on the conventional BARC layer, via step 16. FIG. 2 depicts the conventional PMR head 50 after step 16 is provided. The conventional PMR head 50 is typically a merged head including a conventional PMR write transducer 60 and a read transducer 80. Thus, the conventional read head 80 typically includes a first shield 82, a read sensor 84, and a second shield 86. The read head 80 may be separated from the PMR write transducer 60 by an insulator 54. The conventional PMR transducer 60 includes a first pole 62 and alumina underlayer 64. The conventional seed layer 66 and conventional SiN BARC layer 68 have also been formed. Also shown is the photoresist layer 70.

The photoresist layer 70 is patterned, via step 18. Typically, step 18 is performed utilizing photolithography. Step 18 includes forming a trench in the photoresist layer 70 in which the conventional PMR pole is to be formed. FIG. 3 depicts the conventional PMR head 50 after step 18 has been completed. Thus, a trench 71 has been formed in the photoresist 70'. At the base of the trench 71, footings 73 exist. In addition, because a PMR pole is being formed, the trench 71 has a reverse angle. Stated differently, the angle, $\theta$, is less than ninety degrees. The magnetic material for the PMR pole is deposited via step 20. Step 20 also may include removing an exposed portion of the conventional BARC layer 68 at the base of the trench. Thus, the trench 71 is at least partially filled. Fabrication of the conventional PMR head 50 is completed, via step 22. Step 22 may include removing the resist 70', performing a pole trim and/or chemical mechanical polish (CMP), as well as forming other structures, such as shields. FIG. 4 depicts the conventional PMR head 50 after completion of the method 20. Consequently, the PMR pole 72 has been formed. During formation, a portion of the conventional BARC layer 68 is removed. Subsequently, the resist mask 70' and exposed portions of the BARC layer 68 and seed layer 66 are removed. Thus, only a portion of the seed layer 66' remains. Although shown separately, the seed layer 66' might be indistinguishable from the PMR pole 72. In addition, an insulating layer 74 substantially surrounding the sides of the PMR pole 72 has been provided. In addition, a write gap 76, optional conventional top shield 78, and insulator 79 are also fabricated. The PMR transducer 60 may also include a second pole (not shown) and pole pads (not shown). The shape of the PMR pole 72 substantially conforms to the shape of the trench 71. Consequently, the conventional PMR pole 72 has reverse angle, $\theta$. The conventional PMR head 50 may thus be formed.

Although the conventional method 10 and conventional PMR head 50 function, there are drawbacks. Although the conventional Ru seed layer 66 enables growth of the PMR pole 72, the conventional seed layer 66 is typically strongly reflective. As a result, placing the resist layer 70 directly on the conventional seed layer 66 would adversely affect photolithography used in patterning the photoresist layer 70 in step 18. Use of the conventional SiN BARC layer 72 substantially reduces the reflection from layers below the photoresist layer 70. Consequently, unwanted optical effects due to reflections from the conventional seed layer 66 may be reduced or eliminated.

Although the conventional BARC layer 68 improves the photolithography, use of the conventional BARC layer 68 results in footings 73 that adversely impact the conventional PMR head. The footings 73 are generally believed to be caused by an acid-base interaction between the acidic resist 70 and the basic conventional BARC 68. This interaction is known as resist poisoning. The footings 73 limit the trench line width resolution and increase scumming. As a result, the conventional PMR pole 72 formed within the trench 71 has an increased width. In addition, the process window is decreased. The line width thus varies sharply with a change in the focus conditions for photolithography. In addition, there is a greater variation in the critical dimension of the trench 71 between devices 50. Consequently, processing may need to be more tightly controlled. Thus, performance and manufacturability of the conventional PMR head 50 may be adversely impacted.

Methods have been proposed for removing the footings 73. Such techniques include utilizing an acid treatment and an oxygen plasma treatment of the surface of the conventional BARC layer 68. The acid and oxygen plasma treatments are reported to reduce the footing 73 and reduce scumming. However, such methods may be of limited utility. Particularly in the context of head formation, such treatments may not adequately remove the footings 73.

Accordingly, what is needed is a system and method for improving the fabrication of a PMR head.

BRIEF SUMMARY OF THE INVENTION

A method and system for providing a magnetic writer are described. The method and system comprise providing a bottom antireflective coating (BARC) on a portion of the magnetic writer. The BARC has a low reflectivity. The method and system also include providing a barrier layer on at least a portion of the BAR and providing a mask on at least a portion of the barrier layer. The barrier layer isolates the BARC from the mask.

DETAILED DESCRIPTION OF THE PREFERRED EMBODIMENTS

Figure 5:
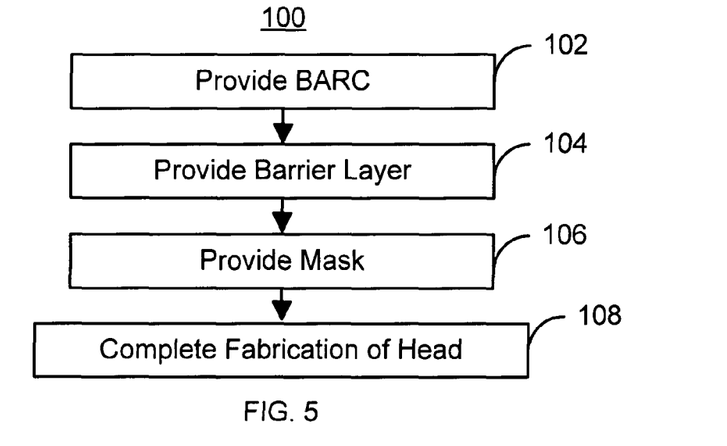
FIG. 5 is a flow chart depicting an exemplary embodiment of a method for providing a structure in a write head.

FIG. 5 is a flow chart depicting an exemplary embodiment of a method 100 for fabricating a structure in a write transducer, such as a PMR head. The method 100 is described in the context of and preferably used for providing a PMR pole of a PMR head. However, in another embodiment, the method 100 may be used in providing another structure that may be in another type of head. For example, the method 100 may be used in providing a conductive line.

A BARC is provided on a portion of the magnetic writer, via step 102. In a preferred embodiment, the BARC is provided on a seed layer, such as Ru, for a PMR pole. The BARC has a low reflectivity and is preferably SiN. However, in another embodiment, other and/or additional materials may be used. Further, in an alternate embodiment, the BARC may be a multilayer.

A barrier layer is provided on at least a portion of the BARC, via step 104. In a preferred embodiment, the thickness of the barrier layer is sufficient to isolate at least the portion of the BARC covered by the barrier from exposure to an ambient. The ambient includes conditions to which the BARC would otherwise be exposed during fabrication until the BARC is removed or covered. For example, the ambient might include exposure to air while moving the writer between apparatus. In one embodiment, the barrier layer has a thickness that is just sufficient to cover the BARC, for example, at least a single monolayer. In a preferred embodiment, step 104 includes depositing a Si layer that has a thickness of not more than forty Angstroms. More preferably, the Si layer has a thickness of at least ten and not more than twenty Angstroms. Also in a preferred embodiment, step 104 includes allowing the Si layer to oxidize such that the barrier layer is silicon oxide. In an alternate embodiment, silicon oxide may be provided directly on the BARC. In another embodiment, other and/or additional materials may be used for the barrier layer in step 104. Further, in an alternate embodiment, step 104 may include providing a multilayer as the barrier layer. In addition step 104 also includes providing a barrier layer that is configured such that the antireflective properties of the BARC are not significantly disturbed. For example, in one embodiment, the barrier layer is configured such that standing waves during photolithography do not exceed tolerances for the photoresist layer, described below. In a preferred embodiment, the barrier layer is configured to increase the low reflectivity of the BARC such that the total reflectivity is not more than twenty percent.

A mask is provided on at least a portion of the barrier layer, via step 106. In a preferred embodiment, step 106 includes providing a layer of photoresist and, via photolithography, forming structures in the photoresist layer. For example, step 106 may include forming one or more trenches in the photoresist layer. In one embodiment, the trench is for a PMR pole for the writer being formed. In such an embodiment, the trench preferably has walls sloped at a negative angle such that the top of the PMR pole being formed is wider than its bottom. For example, in one embodiment, the walls are sloped at an angle of at least seventy and less than ninety degrees. In a preferred embodiment, the walls are sloped at an angle of at least seventy-five and not more than eighty-five degrees. The trench may also be used for conductive lines. In such an embodiment, the sidewalls are preferably substantially vertical. In addition to isolating the BARC from the ambient, the barrier layer also isolates the BARC from the mask. Consequently, physical and chemical interactions between the mask and the BARC may be greatly reduced or prevented.

Formation of the write head may then be completed, via step 108. Step 108 includes forming structures, for example in the trench(es) formed in step 106. Step 108 may also include removing the exposed portion of the barrier layer and/or BARC in the trench(es), then depositing the material for the structure. Step 108 may also include trimming the poles and removing exposed portions of the barrier layer, BARC, and/or seed layer.

Using the method 100, performance and manufacturability of the write transducer may be improved. The barrier layer aids in preventing interaction between the BARC and any ambient to which the BARC would otherwise be exposed and between the BARC and the mask. For example, the barrier prevents the BARC from being exposed to air if the write transducer is exposed to air during fabrication. As a result, the BARC is more stable. Subsequent lithography that forms the mask in step 106 may be less subject to variations. The process window may thereby be improved. For example, the line width may be more stable with a change in the focus conditions for photolithography. Stated differently, a larger depth of focus may be possible. Furthermore, because the BARC is more stable, processing delays may have less of an impact on photolithography performed in step 106. Thus, variations between devices may be reduced. As a result, manufacturability may be improved. The interaction between the BARC and the resist may also be reduced or eliminated by the barrier layer. Consequently, footings in the trench(es) formed in the mask may be reduced or eliminated. The line width resolution may be improved and scumming may be reduced or eliminated. Thus, thinner structures, such as PMR poles or conductive lines, may be fabricated. Consequently, performance and manufacturability of the writer may be improved.

Figure 6:
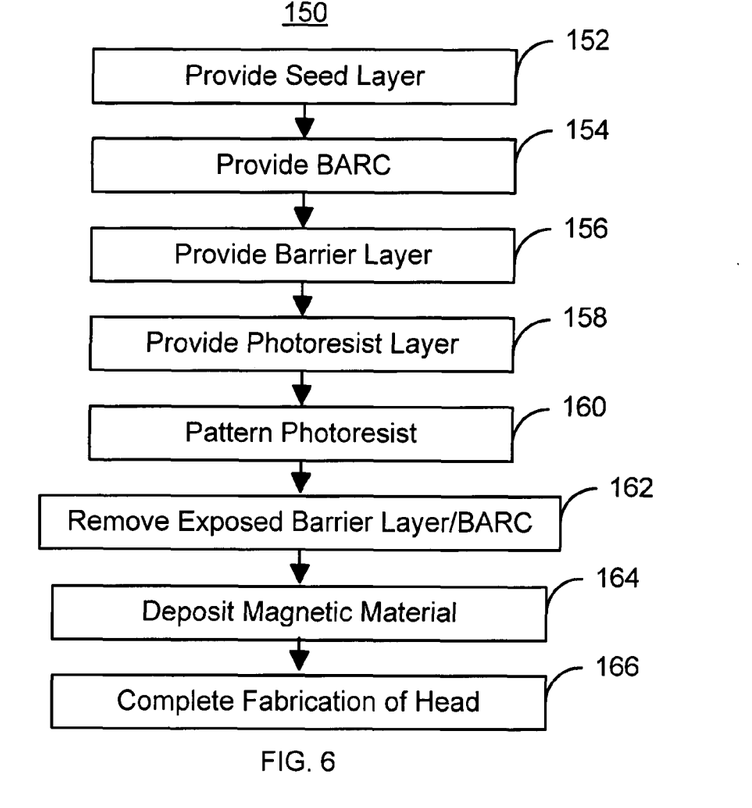
FIG. 6 is a flow chart depicting another exemplary embodiment of a method for providing a structure in a write head.

FIG. 6 is a flow chart depicting an exemplary embodiment of a method 150 for fabricating a structure in a write transducer, such as a PMR head. The method 150 is described in the context of and preferably used for providing a PMR pole of a PMR head. However, in another embodiment, the method 150 may be used in providing another structure that may be in another type of head. FIGS. 7-10 depict an exemplary embodiment of a PMR head 200 during fabrication using the method 150. For clarity, FIGS. 7-10 are not drawn to scale. Referring to FIGS. 6-10, a seed layer is provided, via step 152. The seed layer is preferably Ru, or other material(s) on which the desired structure is to be grown.

A BARC is provided on at least a portion of the seed layer, via step 154. The BARC preferably includes silicon nitride and has a low reflectivity. However, in another embodiment, other and/or additional materials may be used. Further, in an alternate embodiment, the BARC may be a multilayer.

A barrier layer is provided on at least a portion of the BARC, via step 156. The barrier layer is preferably silicon oxide. However, in another embodiment, another material may be used. In a preferred embodiment, step 156 includes depositing a silicon layer and exposing the silicon to air in order to oxidize the silicon. In another embodiment, silicon oxide may be deposited on the BARC layer. In a preferred embodiment, the thickness of the barrier layer is sufficient to isolate at least the portion of the BARC covered by the barrier from exposure to an ambient. If not yet oxidized, the air may oxidize the silicon layer, forming a silicon oxide barrier layer, but not reaching the underlying BARC. In one embodiment, the barrier layer has a thickness that is just sufficient to cover the BARC, for example, at least a single monolayer. In a preferred embodiment, step 156 includes depositing a Si layer that has a thickness of not more than forty Angstroms. More preferably, the Si layer has a thickness of at least ten and not more than twenty Angstroms. Also in a preferred embodiment, step 156 includes allowing the Si layer to oxidize such that the barrier layer is silicon oxide. In an alternate embodiment, silicon oxide may be provided directly on the BARC. In another embodiment, other and/or additional materials may be used for the barrier layer in step 156. Further, in an alternate embodiment, step 156 may include providing a multilayer as the barrier layer. Step 156 also includes providing a barrier layer that is configured such that the antireflective properties of the BARC are not significantly disturbed. For example, in one embodiment, the barrier layer is configured such that standing waves do not exceed desired tolerances for the photoresist layer, described below. In a preferred embodiment, the barrier layer is configured to increase the low reflectivity of the BARC such that the total reflectivity is not more than twenty percent.

Figure 7:
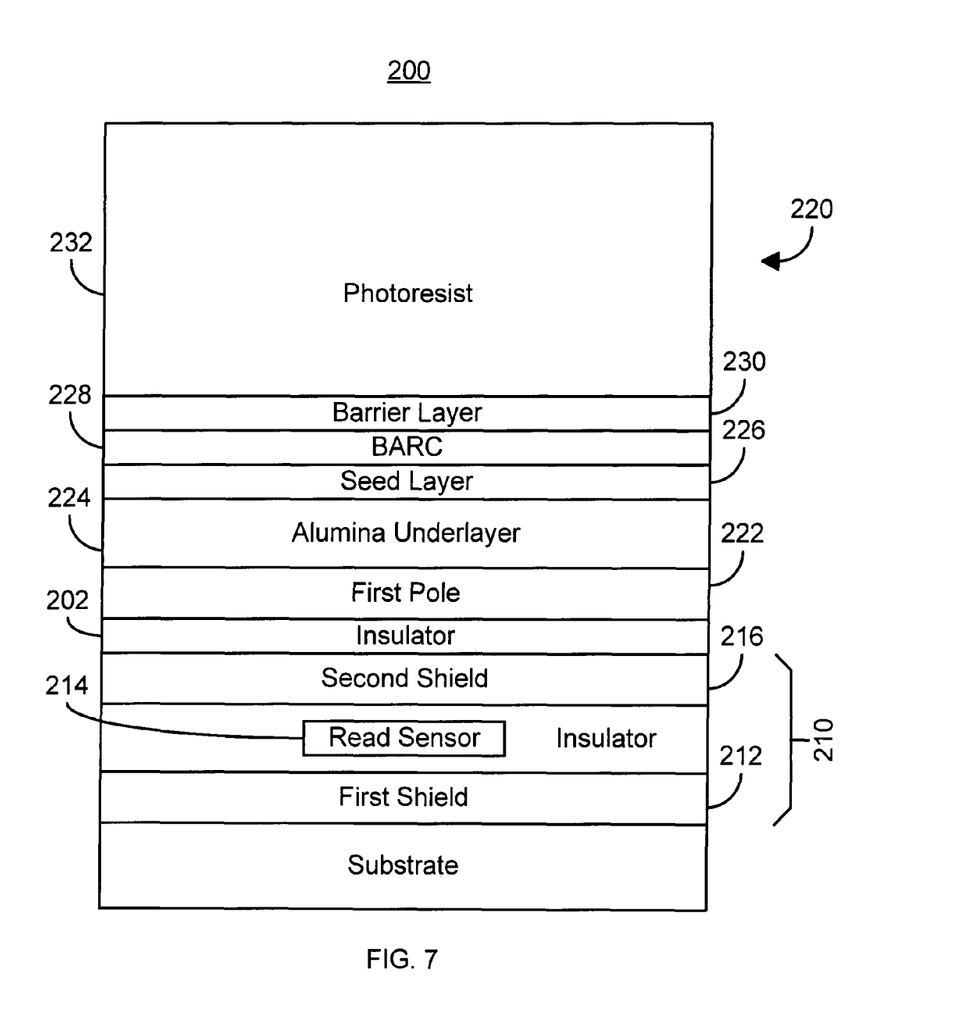
FIGS. 7-10 depict an exemplary embodiment of a perpendicular magnetic recording head during fabrication.

A photoresist layer is provided on at least a portion of the barrier layer, via step 158. FIG. 7 depicts an exemplary embodiment of a PMR head 200 after step 158 is performed. The PMR head 200 is preferably a merged head including a PMR write transducer 220 and a read transducer 210. Thus, the conventional read transducer 210 typically includes a first shield 212, a read sensor 214, and a second shield 216. The read transducer 210 may be separated from the PMR write transducer 220 by an insulator 202. The conventional PMR transducer 220 includes a first pole 222 and alumina underlayer 224. The seed layer 226 provided in step 152 and BARC 228 provided in step 154 have also been formed. The barrier layer 230 is provided in step 156 and the photoresist layer 232 provided in step 158 are also shown.

Figure 8:
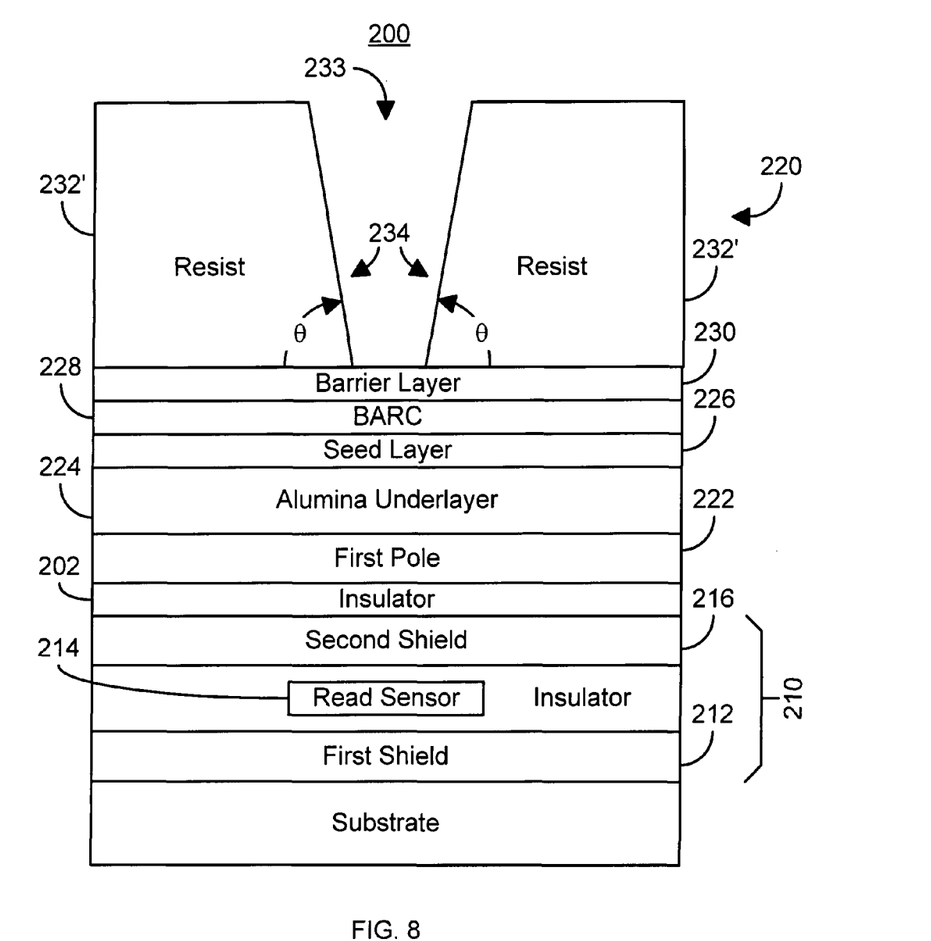

The photoresist layer is patterned to form a mask, via step 160. The mask includes one or more trenches in the photoresist layer 232. FIG. 8 depicts the PMR head 200 after step 160 is formed. Thus, a mask 232' having trench 233 has been formed from the photoresist layer 232 shown in FIG. 7. In the embodiment shown, the trench is for a PMR pole for the writer being formed. In such an embodiment, the trench 233 has sidewalls 234 sloped at a negative angle such that the top of the PMR pole being formed is wider than its bottom. For example, in one embodiment, the sidewalls 234 are sloped at an angle of at least seventy and less than ninety degrees. In a preferred embodiment, the sidewalls 234 are sloped at an angle of at least seventy-five and not more than eighty-five degrees. At least some of the trench(es) formed in step 160 may also be used for conductive lines. In such an embodiment (not shown), the sidewalls are preferably substantially vertical. In addition to isolating the BARC from the ambient, the barrier layer also isolates the BARC from the mask. Consequently, physical and chemical interactions between the mask and the BARC are substantially prevented.

Figure 9:
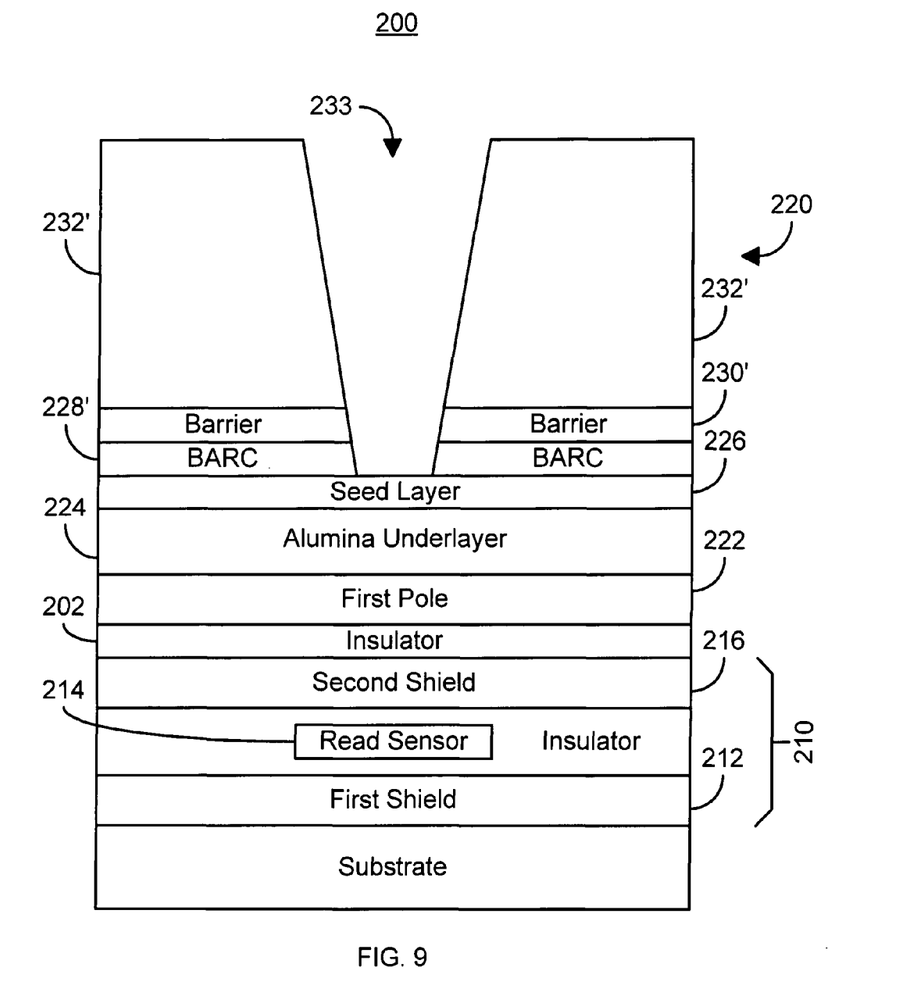

An exposed portion of the barrier layer 230 and an exposed portion of the BARC 228 in the trench 233 are removed, via step 162. FIG. 9 depicts the PMR head 200 after step 162 has been performed. Consequently portions 228' and 230' remain of the BARC and barrier, respectively.

Material for the PMR pole is deposited, via step 164. Note that if another structure, such as a conductive line, were being fabricated, then different material(s) would be provided in steps 164. As a result, the trench 233 is at least partially filled.

Figure 10:
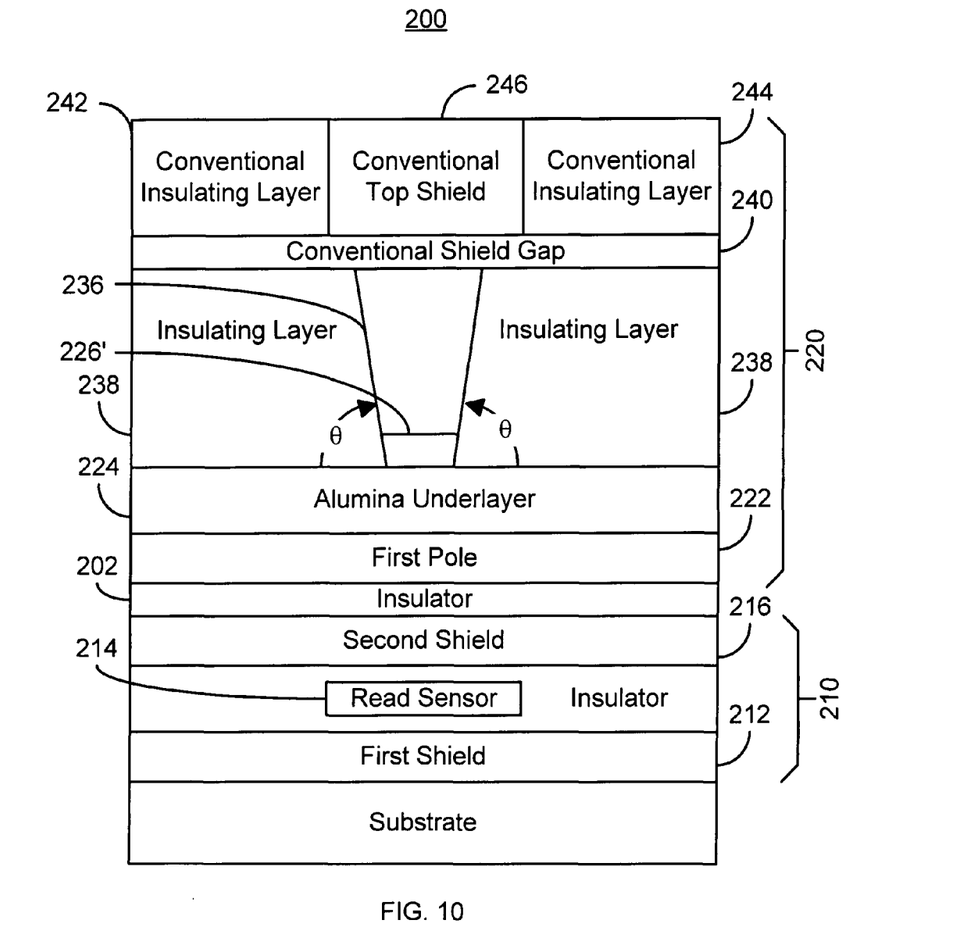

Formation of the PMR head may then be completed, via step 166. Step 166 may include removing the photoresist, trimming the PMR pole, and removing exposed portions of the barrier layer 230', exposed portions of the BARC layer 228', and exposed portions of the seed layer 226, as well as a chemical mechanical polish. Step 166 may also include forming structures. FIG. 10 depicts the PMR head 200 after step 166 has been completed. Consequently, the PMR pole 236 has been formed. During completion, the resist mask 232' and exposed portions of the BARC 228' and seed layer 226 are removed. Thus, only a portion of the seed layer 226' remains. Although shown separately, note that the seed layer 226' and the PMR pole 236 might not be distinguishable. In addition, an insulating layer 238 substantially surrounding the sides of the PMR pole 236 has been provided. In addition, a write gap 240, optional conventional top shield 246, and insulator 244 are also fabricated. The PMR transducer 220 may also include a second pole (not shown) and pole pads (not shown). The shape of the PMR pole 236 substantially conforms to the shape of the trench 233. Consequently, the PMR pole 236 has reverse angle, θ. The PMR head 200 may thus be formed.

Using the method 150, performance and manufacturability of the write transducer may be improved. The method 150 shares the benefits of the method 100. Consequently, performance and manufacturability of the writer 200 may be improved. In particular, the barrier layer 230/230' aids in preventing interaction between the BARC 228/228' and an ambient and between the BARC 228/228' and the mask 232'. As a result, the BARC 228/228' is more stable. Lithography that forms the mask 232' is thus less subject to variations. Consequently, the process window is improved. For example, the line width may be more stable with a change in the focus conditions for photolithography. Stated differently, a larger depth of focus may be possible. Furthermore, because the BARC 228/228' is more stable, processing delays may have less of an impact on photolithography performed in step 160. Thus, variations between devices may be reduced. As a result, manufacturability may be improved. The interaction between the BARC 228/228' and the resist 232/232' may also be reduced or eliminated by the barrier layer 230/230'. Consequently, footings in the trench(es) 233 formed in the mask 232' may be reduced or eliminated. The line width resolution may be improved and scumming may be reduced or eliminated. Thus, thinner structures, such as PMR poles 236, conductive lines (not shown), and/or other structures, may be fabricated. Consequently, performance and manufacturability of the PMR head 200 may be improved.

We claim:

1. A method for providing a magnetic writer comprising;
   providing a bottom antireflective coating (BARC) on a portion of the magnetic writer having a reflectivity, the BARC having a low reflectivity, the low reflectivity being less than the reflectivity;
   providing a barrier layer residing on at least a portion of the BARC, the barrier layer chemically isolating the at least the portion of the BARC from at least one structure above the barrier layer and from exposure to an ambient; and
   providing a structure on at least a portion of the barrier layer, wherein the barrier layer has a thickness of not more than forty Angstroms.

2. The method of claim 1 wherein the barrier layer is configured to increase the low reflectivity of the BARC such that a total reflectivity does not exceed a desired reflectivity.

3. The method of claim 1 wherein the barrier layer is configured to increase the low reflectivity of the BARC such that a total reflectivity is not more than twenty percent.

4. The method of claim 1 wherein the barrier layer step of providing the barrier layer further includes:
   providing a silicon layer.

5. The method of claim 4 wherein the step of providing the barrier layer further includes:
   allowing at least a portion of the silicon layer to oxidize to form silicon oxide.

6. The method of claim 5 wherein the step of providing the barrier layer further includes:
   depositing the silicon layer having a thickness, the thickness being sufficient such that the silicon oxide isolates the at least the portion of the BARC from exposure to an ambient.

7. The method of claim 1 wherein the barrier layer further includes a silicon dioxide layer.

8. The method of claim 1 wherein the barrier layer has a thickness of at least a monolayer.

9. The method of claim 1 wherein the mask has a trench therein, the trench having non-perpendicular sidewalls and wherein the method further includes:
provided a perpendicular magnetic pole in the trench.

10. The method of claim 9 further comprising:
removing an exposed portion of the barrier layer and an exposed portion of the BARC in the trench prior to providing the perpendicular magnetic recording pole.

11. The method of claim 9 wherein the portion of the magnetic writer includes a seed layer.

12. The method of claim 1 wherein the BARC providing further includes:
providing a silicon nitride antireflective layer.

13. The method of claim 1 wherein the mask has at least one trench therein and wherein the method further includes:
depositing at least one conductive line within the trench.

14. A magnetic writer comprising;
a bottom antireflective coating (BARC) on a portion of the magnetic writer having a reflectivity, the BARC having a low reflectivity, the low reflectivity being less than the reflectivity;
a barrier layer residing on at least a portion of the BARC, the barrier layer chemically isolating the at least the portion of the BARC from at least one structure above the barrier layer and from exposure to an ambient; and
a structure on at least a portion of the barrier layer;
wherein the barrier layer has a thickness of not more than forty Angstroms.

15. The magnetic writer of claim 14 wherein the structure is a conductive line.

16. The magnetic writer of claim 14 wherein the barrier layer is configured to increase the low reflectivity of the BARC such that a total reflectivity does not exceed a desired reflectivity.

17. The magnetic writer of claim 16 wherein the barrier layer further includes silicon oxide.

18. The magnetic writer of claim 17 wherein the barrier layer further has a thickness the thickness being sufficient such that the silicon oxide isolates the at least the portion of the BARC from exposure to the ambient.

19. The magnetic writer of claim 14 wherein the barrier layer is configured to increase the low reflectivity of the BARC layer such that a total reflectivity is not more than twenty percent.

20. The magnetic writer of claim 14 wherein the barrier layer has a thickness of at least a monolayer.

21. A magnetic writer comprising;
a bottom antireflective coating (BARC) on a portion of the magnetic writer, the BARC having a low reflectivity;
a barrier layer residing on at least a portion of the BARC, the barrier layer chemically isolating the at least the portion of the BARC from at least one structure above the barrier layer and from exposure to an ambient; and
a structure on at least a portion of the barrier layer;
wherein the BARC further includes silicon nitride.

* * * * *